(12) United States Patent
Quinn

(10) Patent No.: US 10,506,286 B1
(45) Date of Patent: *Dec. 10, 2019

(54) SET-TOP BOX REBOOT AND POLLING TOOL

(71) Applicant: CSC Holdings, LLC, Bethpage, NY (US)

(72) Inventor: Christopher Quinn, Plainview, NY (US)

(73) Assignee: CSC Holdings, LLC, Bethpage, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/805,474

(22) Filed: Nov. 7, 2017

Related U.S. Application Data

(63) Continuation of application No. 15/051,331, filed on Feb. 23, 2016, now Pat. No. 9,866,905.

(51) Int. Cl.
| | | |
|---|---|---|
| H04N 21/443 | (2011.01) |
| H04N 21/485 | (2011.01) |
| G06F 9/4401 | (2018.01) |
| G06F 1/24 | (2006.01) |
| G06F 11/30 | (2006.01) |
| H04L 12/26 | (2006.01) |
| H04L 29/08 | (2006.01) |

(Continued)

(52) U.S. Cl.
CPC .......... *H04N 21/4432* (2013.01); *G06F 1/24* (2013.01); *G06F 9/4416* (2013.01); *G06F 11/3006* (2013.01); *G06F 11/3013* (2013.01); *G06F 11/3055* (2013.01); *H04L 43/10* (2013.01); *H04N 21/485* (2013.01); *G06F 8/65* (2013.01); *G06F 12/1408* (2013.01);
*H04L 41/0893* (2013.01); *H04L 67/14* (2013.01); *H04L 67/34* (2013.01)

(58) Field of Classification Search
CPC .... H04N 21/4432; H04N 21/485; G06F 1/24;
G06F 9/4416; G06F 11/3006; G06F 11/3013; G06F 11/3055; G06F 8/65; G06F 12/1408; H04L 43/10; H04L 41/0893; H04L 67/14; H04L 67/6734; H04L 67/34

USPC ......... 713/1, 2, 100; 717/171; 709/227, 230; 714/47.1

See application file for complete search history.

(56) References Cited

U.S. PATENT DOCUMENTS

| | | |
|---|---|---|
| 6,259,442 B1 | 7/2001 | Britt, Jr. et al. |
| 6,631,409 B1 | 10/2003 | Watson et al. |

(Continued)

OTHER PUBLICATIONS

U.S. Appl. No. 15/051,331, filed Feb. 23, 2016, entitled "Set-Top Box Reboot and Polling Tool".

*Primary Examiner* — Ji H Bae
(74) *Attorney, Agent, or Firm* — Sterne, Kessler, Goldstein & Fox P.L.L.C.

(57) ABSTRACT

A system and method for polling a plurality of client devices of different types are provided. A reboot and polling tool pre-polls client devices, where the pre-poll is specific to a type of client device and identifies a state of the client devices. The reboot and polling tool then executes a script on the client devices that changes the state of the plurality of client devices. After the script is executed, the reboot and polling tool post-polls the client devices where the post-poll is specific to the type of client device and the post-poll provides information that identifies changes in the state of the client devices caused by the script.

20 Claims, 8 Drawing Sheets

(51) Int. Cl.
*G06F 8/65* (2018.01)
*H04L 12/24* (2006.01)
*G06F 12/14* (2006.01)

(56) References Cited

U.S. PATENT DOCUMENTS

| | | |
|---|---|---|
| 6,640,334 B1 | 10/2003 | Rasmussen |
| 8,601,170 B1 | 12/2013 | Marr et al. |
| 9,866,905 B1 * | 1/2018 | Quinn ................ H04N 21/4432 |
| 2005/0144616 A1 | 6/2005 | Hammond et al. |
| 2013/0061216 A1 | 3/2013 | Adler et al. |
| 2013/0215900 A1 | 8/2013 | Jogadhenu |
| 2014/0286354 A1 | 9/2014 | Van De Poel et al. |

\* cited by examiner

300A

Pre Poll Data – OMS Table

| ACP | Type | Field Name | Result | Count | Get IPs |
|---|---|---|---|---|---|
| 132903 | oms | Boot Time | Older | 1520 | Click for IP List |
| 132903 | oms | Boot Time | Yesterday | 26 | Click for IP List |
| 132903 | oms | Boot Time | Today | 37 | Click for IP List |
| 132903 | oms | Last Inbnd Time Fail | 417000000 | 1 | Click for IP List |
| 132903 | oms | Last Inbnd Time Fail | N/A | 1294 | Click for IP List |
| 132903 | oms | Last Inbnd Time Fail | 717000000 | 1 | Click for IP List |
| 132903 | oms | Last Inbnd Time Fail | 183000000 | 2 | Click for IP List |
| 132903 | oms | Last Inbnd Time Fail | 537000000 | 2 | Click for IP List |
| 132903 | oms | Last Inbnd Time Fail | 219000000 | 9 | Click for IP List |
| 132903 | oms | Last Inbnd Time Fail | 63000000 | 22 | Click for IP List |
| 132903 | oms | Last Inbnd Time Fail | 447000000 | 1 | Click for IP List |
| 132903 | oms | Last Inbnd Time Fail | 279000000 | 1 | Click for IP List |
| 132903 | oms | Last Inbnd Time Fail | 741000000 | 1 | Click for IP List |
| 132903 | oms | Last Inbnd Time Fail | 369000000 | 7 | Click for IP List |
| 132903 | oms | Last Inbnd Time Fail | 699000000 | 14 | Click for IP List |
| 132903 | oms | Last Inbnd Time Fail | 747000000 | 2 | Click for IP List |
| 132903 | oms | Last Inbnd Time Fail | 207000000 | 3 | Click for IP List |
| 132903 | oms | Last Inbnd Time Fail | 201000000 | 6 | Click for IP List |
| 132903 | oms | Last Inbnd Time Fail | 693000000 | 2 | Click for IP List |
| 132903 | oms | Last Inbnd Time Fail | 783000000 | 1 | Click for IP List |
| 132903 | oms | Last Inbnd Time Fail | 675000000 | 1 | Click for IP List |
| 132903 | oms | Last Inbnd Time Fail | 345000000 | 4 | Click for IP List |
| 132903 | oms | Last Inbnd Time Fail | 387000000 | 4 | Click for IP List |

Post Poll Data – OMS Table

| ACP | Type | Field Name | Result | Count | Get IPs |
|---|---|---|---|---|---|
| 132903 | oms | Boot Time | Today | 1581 | Click for IP List |
| 132903 | oms | Last Inbnd Time Fail | NA | 68 | Click for IP List |
| 132903 | oms | Last Inbnd Time Fail | na | 1513 | Click for IP List |
| 132903 | oms | Last STB Reboot Reason | 25.0 | 1581 | Click for IP List |
| 132903 | oms | Non Responders | NR | 22 | Click for IP List |
| 132903 | oms | Registration Status | na | 1513 | Click for IP List |
| 132903 | oms | Registration Status | Registered | 68 | Click for IP List |
| 132903 | oms | VOD SG | 42111 | 21 | Click for IP List |
| 132903 | oms | VOD SG | na | 1513 | Click for IP List |
| 132903 | oms | VOD SG | 42214 | 35 | Click for IP List |
| 132903 | oms | VOD SG | 42219 | 12 | Click for IP List |

Post Poll Data – SA Table

| ACP | Type | Field Name | Result | Count | Get IPs |
|---|---|---|---|---|---|
| 132903 | sa | Analog Capable | YES | 1126 | Click for IP List |
| 132903 | sa | BFS | Ready | 1127 | Click for IP List |

SET-TOP BOX REBOOT AND POLLING TOOL

CROSS-REFERENCE TO RELATED APPLICATIONS

The present application is a continuation of U.S. patent application Ser. No. 15/051,331, filed Feb. 23, 2016, now U.S. Pat. No. 9,866,905, which is incorporated herein by reference in its entirety.

BACKGROUND

Field

Embodiments are generally directed to rebooting and polling client devices, and more particularly to rebooting and polling client devices that do not have a common communication interface.

Background Art

Client devices may be of different types. Even though client devices are of different types, these client devices connect to a common network and have a common polling and communication interface. The common polling and communication interface allows a server or an application to poll the client devices in a network for status and information. However, there are also client devices, such as set-top boxes manufactured by different manufactures that were specifically designed to communicate within a network of like client devices. These client devices lack a common polling and communication interface that allows a server or an application to poll these client devices together with other client devices of different types for status and information. Therefore, what is needed are system and methods to poll client devices that lack a common polling and communication interface when the client devices function in a network.

BRIEF SUMMARY OF EMBODIMENTS

A system and method for polling a plurality of client devices of different types are provided. A reboot and polling tool pre-polls client devices, where the pre-poll is specific to a type of client device and identifies a state of the client devices. The reboot and polling tool then executes a script on the client devices. After the script is executed, the reboot and polling tool post-polls the client devices where the post-poll is specific to the type of client device and the post-poll provides information that identifies changes in the state of the client devices caused by the script.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

FIGS. 1A-B are block diagrams of a computing system environment, according to an embodiment.

FIG. 2 is a block diagram of an environment that includes a reboot and polling tool, according to an embodiment.

FIGS. 3A-B are diagrams of tables that display information associated with polled client devices, according to an embodiment.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Provided herein are system and method embodiments, and/or combinations and sub-combinations thereof, for rebooting and polling client devices.

Figure 1A:
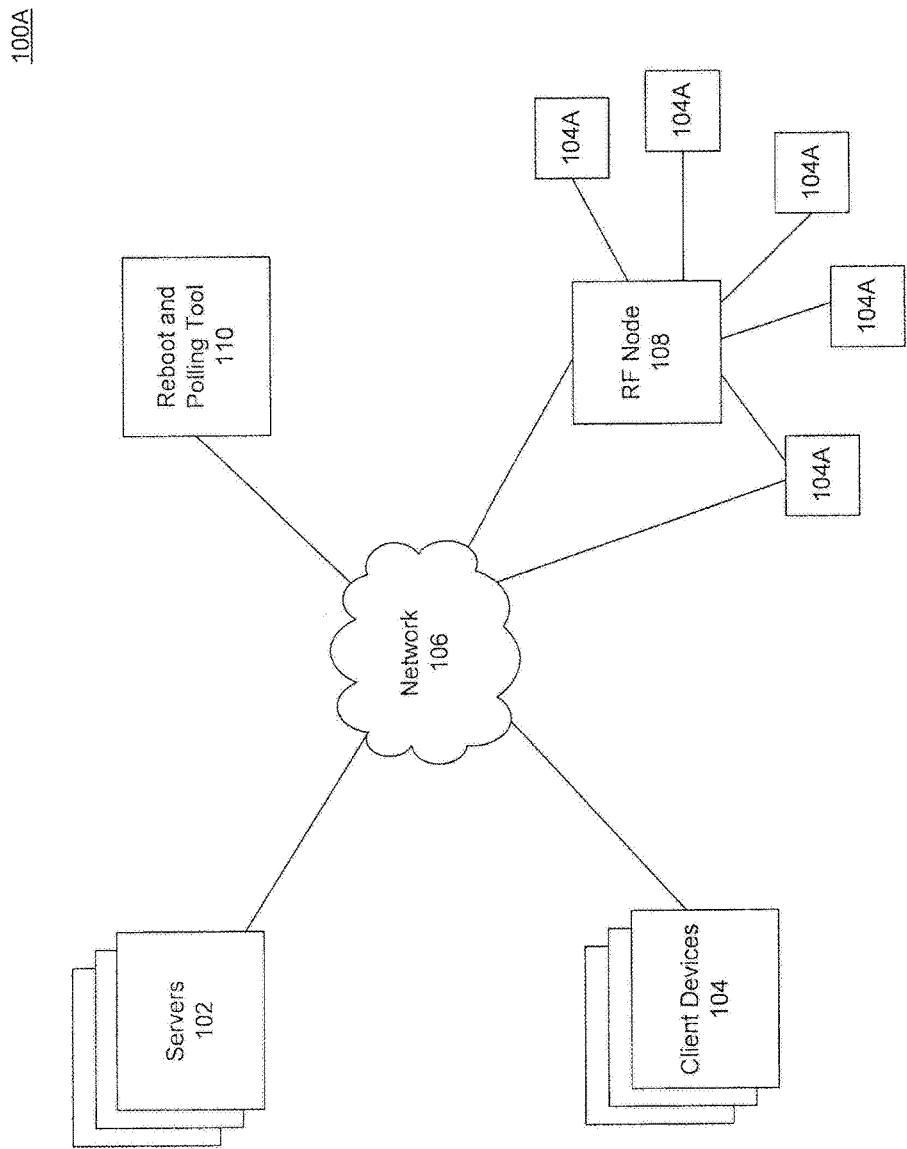

FIG. 1A is a block diagram of a computing system environment 100, according to an embodiment. Computing system environment 100 or simply system 100 includes multiple servers 102 that are connected to multiple client devices 104 over network 106.

In an embodiment, servers 102 receive requests from client devices 104, and also respond and process the requests. Additionally, servers 102 may download applications, data, and upgrades onto client devices 104. Example servers 102 may be application servers that provide client devices 104 with access to applications, communication servers that enable communication between client devices 104, computing servers that include vast amounts of computing resources, such as processors and memory operable to perform mathematically intensive calculations, database servers that collect and store data, file servers that store files and/or folders, media servers that provide client devices 104 with media content (such as digital video and/or digital audio) as programmed, on-demand, or through media streaming, web servers that provide client devices 104 with access to web pages and web content, etc.

In an embodiment, client devices 104 may be electronic devices that are controlled and/or manipulated by users. Client devices 104 are capable of requesting and receiving resources, applications, media streams, etc., from servers 102 over network 106. Example client devices 104 include, but are not limited, to personal computers, laptop computers, smartphones, and tablet computers, set-top boxes, televisions connected to network 106, and devices that provide televisions with network accessibility and media content. Client devices 104 may have some or all components of a computing device described in FIG. 6.

In an embodiment, network 106 may be any network or combination of networks that can carry data. Network 106 includes, but is not limited, to a local area network, metropolitan area network, and/or wide area network, such as the Internet. Network 106 can support technologies, such as the World Wide Web ("the Web"), that provide access to services and applications using protocols, such as a HyperText Transfer Protocol ("HTTP"). Intermediate web servers, gateways, or other servers may be provided between components of the system 100, depending upon a particular application or environment. System 100 may include thousands of servers 102 and client devices 104 that communicate with each other over network 106.

In an embodiment, system 100 may also include a radio frequency (RF) node 108. Although embodiments herein are described with respect to RF node 108, the embodiments may also be implemented using other types of network nodes, such as, Internet nodes, LAN nodes, WAN nodes, base station nodes, etc. System 100 may use RF node 108 and also other nodes to poll one or more client devices 104. There may be one or more client devices 104 that are associated with RF node 108, such as client devices 104A. Server 102 may poll a subset of client devices 104, by selecting a particular RF node. For example, server 102 may select RF node 108 and poll client devices 104A that are associated with RF node 108 using frequency associated with RF node 108. In an embodiment, RF node 108 is used to poll client devices 104 when client devices 104 lack operating system and/or other communication software that provides polling and communication interfaces that poll client devices 104 directly over network 106.

In an embodiment, client devices 104 may be or function as set-top boxes. Set-top boxes may be electronic devices that are connected to network 106 and one or more television sets. In an embodiment, set-top boxes receive data from other devices in network 106, such as one or more head-end(s) (not shown) and servers 102 and transform the data into content that is viewable on one or more television sets.

In an embodiment, client devices 104 in network 106 may be upgraded with software or applications. In an embodiment, to upgrade client devices 104, client devices 104 are first identified in network 106. Once identified, client devices 104 are polled, upgraded, and then rebooted after the upgrade. In an embodiment, to poll and reboot client devices 104, and also to perform an upgrade, system 100 includes reboot and polling tool 110. Reboot and polling tool 110 may be included in server 102, client device 104, or include frontend and backend components that execute on server 102 and client device 104 and are coupled over network 106. In an embodiment, reboot and polling tool 110 may select client devices 104 that require an upgrade, poll the selected client devices 104 before the upgrade, generate and execute a script that changes the state of selected client devices 104, and poll the upgraded client devices 104 after a reboot or an upgrade. For example, a change in state of client devices 104 may occur when the script upgrades and reboots the selected client devices 104.

In a further embodiment, reboot and polling tool 110 may poll client devices 104 using RF node 108.

Figure 1B:
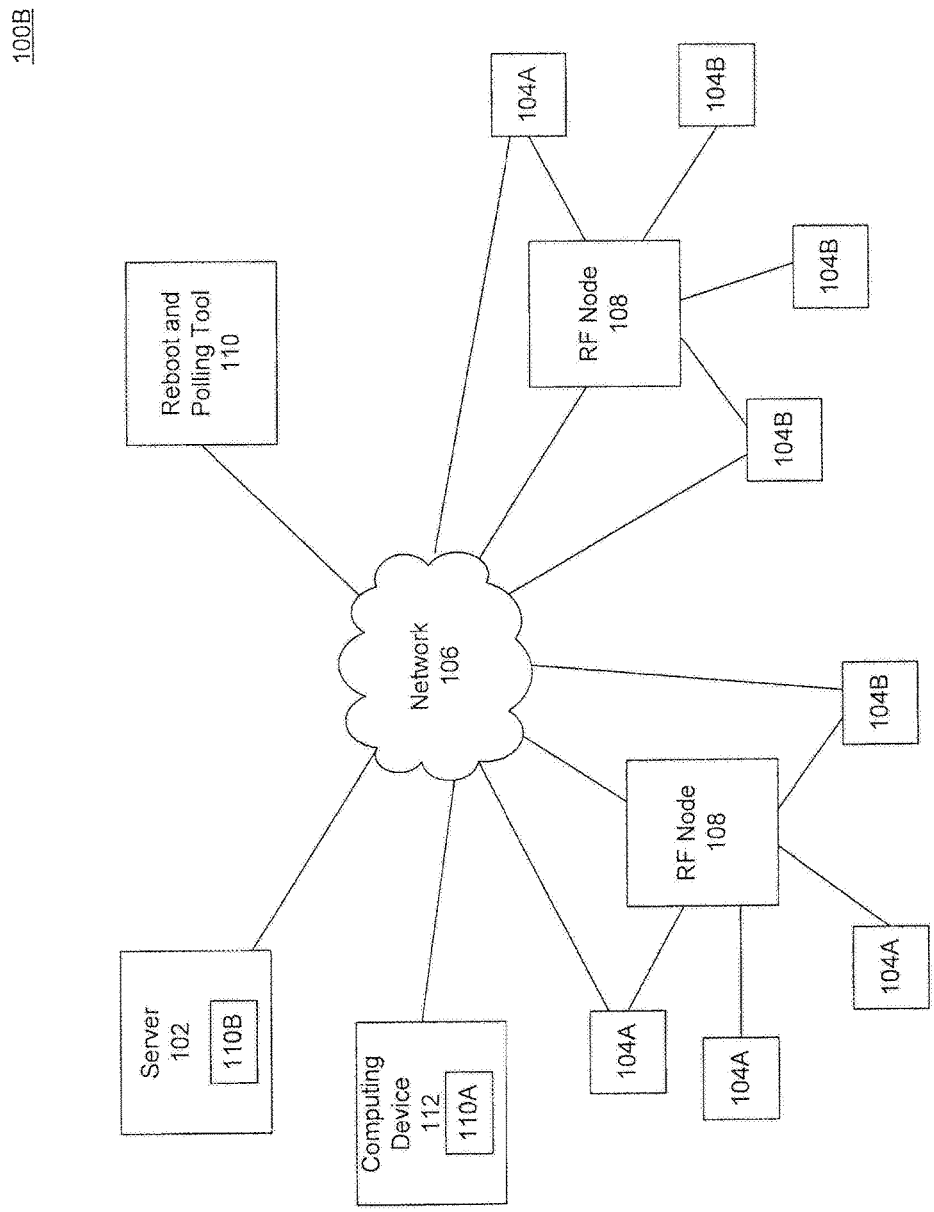

FIG. 1B is a block diagram of another computing system environment 100B, according to an embodiment. Computing system environment 100B (also referred to as system 100B) includes multiple servers 102 and client devices 104A and 104B. Client devices 104A and 104B may be set-top boxes of different types. In an embodiment, client devices 104A may be able to communicate with other like devices, such as client devices 104B, and client devices 104B may be able to communicate with other like devices, such as client devices 1048. In a further embodiment, there may be one communication protocol that client devices 104A may use to communicate with other client devices 104A and servers 102, and another communication protocol that client devices 104B may use to communicate with other client devices 104B and server 102. For example, client device 104A may be a set-top box of one type and client device 104B may be a set-top box of a different type. In an embodiment, server 102 may communicate with client devices 104A and 104B using different communication protocols, different messages, same messages but with different fields inserted and defined, etc. Further, client devices 104A and 104B may also communicate with server 102 using different communication protocols that are not standardized among client devices 104A and 104B.

In an embodiment, client devices 104A and 104B may be associated with the same RF node, such as RF node 108. There may be multiple RF nodes 108 in system 100B. In an embodiment, client devices 104A and 104B associated with the same RF node 108 may receive messages using the same frequency, while client devices 104A and 104B associated with a different RF node 108 may receive messages using a different frequency. In a further embodiment, server 102 may use RF node 108 to reboot client devices 104A and 104B, and to request state and status information from client devices 104A and 104B before and after the reboot.

In an embodiment, system 100B also includes a reboot and polling tool 110, which is operable to communicate with client devices 104A and 104B. In a further embodiment, reboot and polling tool 110 may execute on server 102, or may include a frontend component 110A and backend component 110B. Frontend component 110A may execute on computing device 112, and backend component 110B may execute on server 102, respectively. Computing device 112 may be a user operated device such as a desktop, laptop, tablet, smartphone, etc., and is typically operated by a system administrator who has access to reboot and polling tool 110.

Figure 2:
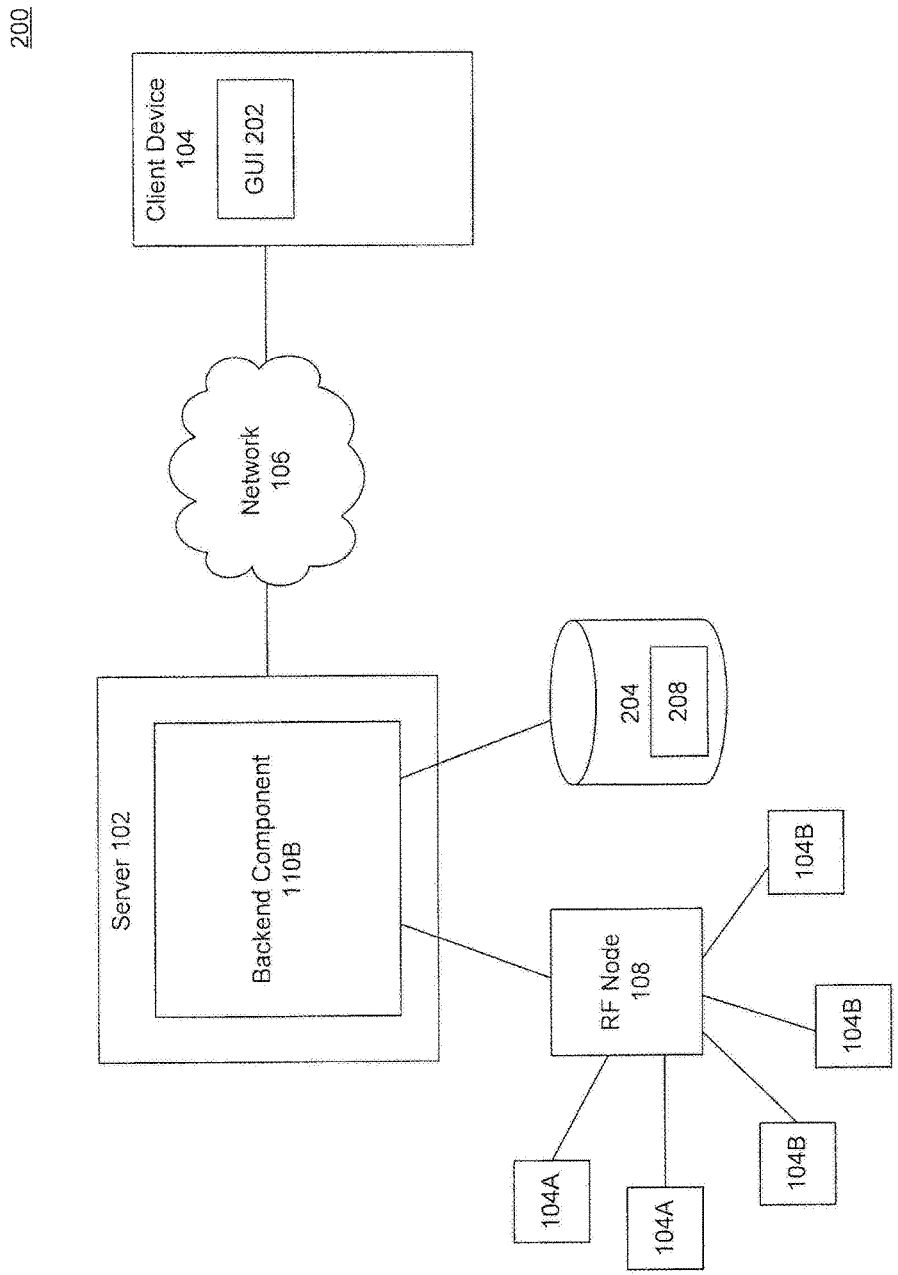

FIG. 2 is a block diagram 200 of an environment that includes a reboot and polling tool, according to an embodiment. As discussed above, reboot and polling tool may include frontend and backend components. Frontend component 110A of reboot and polling tool 110 may include or be coupled to a graphical user interface or a GUI 202. GUI 202 may be displayed on computing device 112. In a further embodiment, GUI 202 may be part of a web interface that communicates with the backend component 110B of reboot and polling tool 110 which executes on server 102. The implementation is not limited to this embodiment, however, and GUI 202 may be included as part of reboot and polling tool 110 (not shown). Example communication interface that GUI 202 uses to communicate with server 102 may include, but is not limited to, a HyperText Markup Language (HTML), cascading style sheets (CSS), Extensible Markup Language (XML) or other web languages or combination of languages.

In an embodiment, GUI 202 may receive input that selects client devices 104A and 1048 that may require a software upgrade and a reboot. As discussed above, client devices 104A and 1048 may be associated with RF node 108. Client devices 104A and 104B that are connected to the same RF node 108 receive signals using the same frequency wavelength and are typically spread out in the same geographic area. In an embodiment, a geographic area may be defined by a city, zip code, area code, state, geographic boundaries, geographic coordinates, etc. In a further embodiment, client devices 104 in adjacent geographic areas may connect to different RF nodes 108, and receive different instructions, upgrades, etc., from reboot and polling tool 110.

In an embodiment, GUI 202 may receive instructions that select one or more RF nodes 108. Once RF node 108 is selected, reboot and polling tool 110 may issue messages, instructions, reboot commands, system information commands, and/or polling commands to client devices 104A and 104B that are coupled to the selected RF node 108 using the frequency associated with the selected RF node 108 or another interface, identifier, etc., that is specific to RF node 108. Additionally, GUI 202 may also receive instructions that identify the date that reboot and polling tool 110 may issue polling and/or reboot instructions to client devices 104A and 104B.

In an embodiment, GUI 202 causes reboot and polling tool 110 to transmit the selection that includes one or more RF nodes 108 and the selected date to reboot and polling tool 110. In an embodiment, GUI 202 may format the selected RF node 108 information and the date using HTML and/or one or more scripting libraries, such as jQuery into a message, and transmit the message to reboot and polling tool 110 or backend component 110B of reboot and polling tool 110.

In an embodiment, reboot and polling tool 110 receives the message that includes the selected RF node 108 information and the date. In an embodiment, reboot and polling tool 110 may use the selected RF node 108 to identify client devices 104A and 104B associated with the selected RF node 108. In an embodiment, reboot and polling tool 110 may also store information associated with the identified client devices 104A and 104B in storage 204 as upgrade information 208 (or information 208). In an embodiment, storage 204 may be a database or another non-volatile storage. In a further embodiment, reboot and polling tool 110 may format information 208 using a structured query language (SQL) or another programming language and submit the query to storage 204.

In a further embodiment, GUI 202 may also receive input that generates a script. The script may execute an upgrade or a reboot on client devices 104A and 104B. For example, a user may use GUI 202 in combination with one or more input devices described in FIG. 6 to create a script. In another example, GUI 202 may present a listing of scripts from which a user may select a script to execute on client devices 104A and 104B. Reboot and polling tool 110 may then associate the selected script with RF node 108. In an embodiment, the scripts may also be stored in storage 204. In a further embodiment, a script may be generated from a template. The template provides a set of instructions that a script may execute. The template may then be supplemented with data provided by a user using GUI 202, with the data that includes client device identifiers, data that includes RF node identifiers, data that includes client device types, etc. Further based on the data incorporated into the template, the script may execute some instructions in the template, and not others.

In an embodiment, reboot and polling tool 110 may execute the selected script on client devices 104A and 104B. To execute the script, reboot and polling tool 110 may select information 208 associated with client devices 104A and 104B from storage 204, format a script into one or more messages, and transmit the one or more messages to client devices 104A and 104B. In a further embodiment, reboot and polling tool 110 may use information 208 to identify a type of client device 104A or 104B and generate one or more messages in a format compatible with the type of client device.

In an embodiment, reboot and polling tool 110 may also poll client devices 104A and 104B before (pre-poll) and after (post-poll) executing the script. Additionally, reboot and polling tool 110 may also provide information on the results of the polled client devices 104A and 104B and display the information using GUI 202. In an embodiment, FIG. 3A is a diagram of a table 300A that displays information associated with client devices 104A and 104B before reboot and polling tool 110 executes the script, and FIG. 3B is a table 300B of information associated with client devices after reboot and polling tool executes the script. FIGS. 3A and 3B are discussed below.

In an embodiment, reboot and polling tool 110 may collect information from client devices 104A and 104B using a Simple Network Management Protocol (SNMP) or another protocol. Because client devices 104A and 104B are of different types that may be incompatible with each other, client devices 104A and 104B receive different SNMP request messages from and also transmit different SNMP messages back to reboot and polling tool 110. For example, the messages may include different fields, populate different fields, and include different information within one or more fields that is particular to a type of client device.

In an embodiment, prior to collecting information from client devices 104A and 104B that are associated with RF node 108, reboot and polling tool 110 first identifies the active client devices. In an embodiment, active client devices are client devices 104A and 104B that have been assigned to a user or a customer. In an embodiment, active client devices 104A and 104B may be identified as devices having a media access control address (MAC address) and/or an Internet Protocol address (IP address). A person skilled in the art will appreciate that a MAC address is unique to each client device 104 and the IP address is the address that a client device uses to connect to a network, such as network 106. In a further embodiment, reboot and polling tool 110 may connect to storage 204 or another storage that stores a listing of active client devices that have been distributed to customers and are associated with RF node 108. Reboot and polling tool 110 may then cross-reference the active client devices, as shown, using the MAC and IP addresses against a listing of client devices in storage 204.

In an embodiment, the script generated or selected using reboot and polling tool 110 may differentiate between types of client devices 104A and 104B. In one example, the listing of client devices stored in storage 204 may identify a type of client device, such as, client device 104A and 104B. In another example, the script may identify a type of client device based on the MAC address. Once the script determines the type of a client device, the script may generate a message, such as an SNMP message, that is particular to the type of client device. Reboot and polling tool 110 may then transmit the message to the respective client device 104A or 104B using SNMP protocol. As discussed above, the message may cause the client device to perform an upgrade, reboot the client device, or poll the client device for information.

Figure 4:
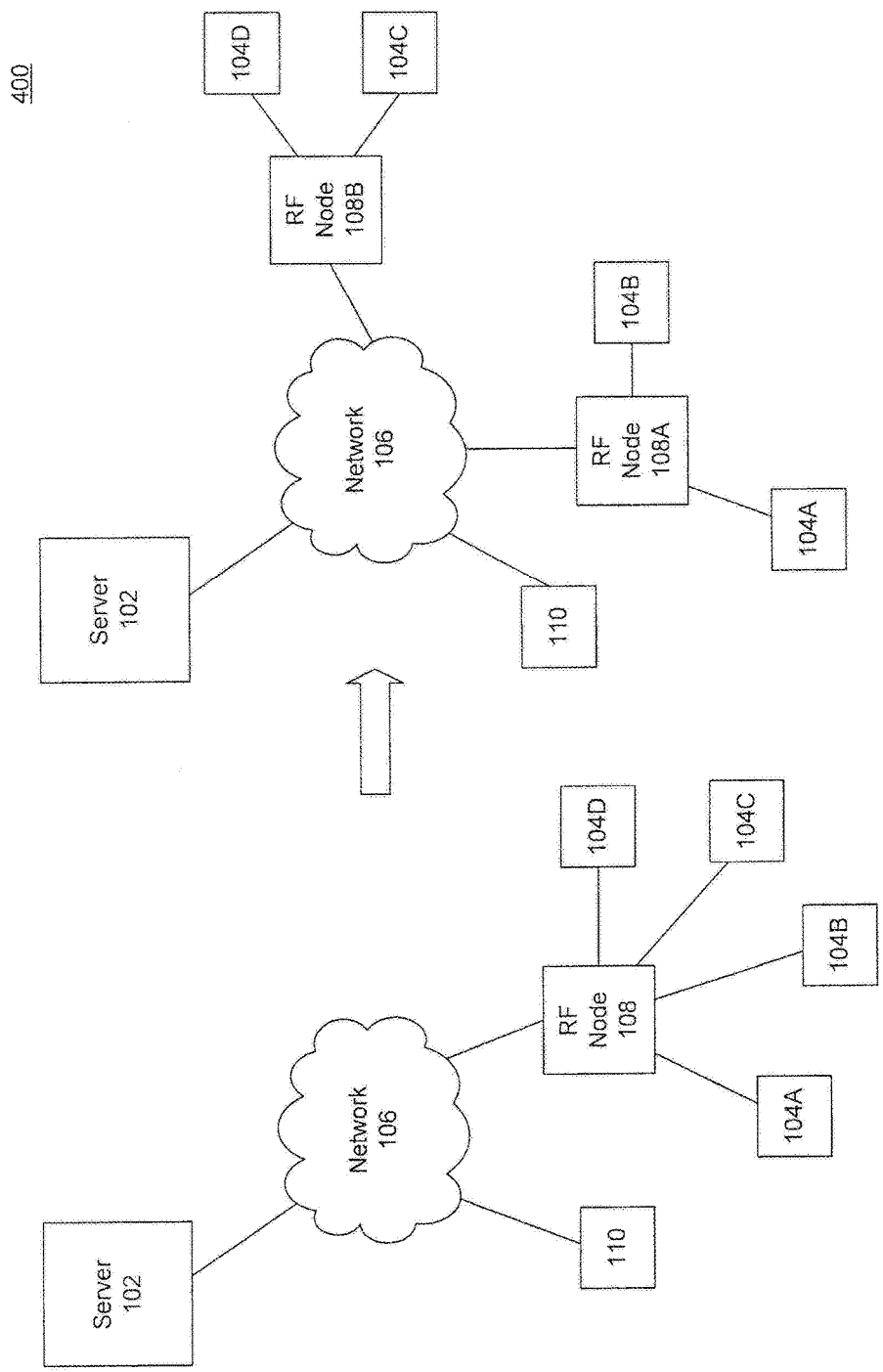
FIG. 4 is a block diagram of a reboot and polling tool reconnecting client devices from one RF node to two RF nodes, according to an embodiment.

In an embodiment, a script may reconnect client devices 104A and 1048B to different RF nodes. FIG. 4 is a block diagram 400 of a reboot and polling tool reconnecting client devices from one RF node to two RF nodes, according to an embodiment. For example, reboot and polling tool 110 may execute a script that splits RF node 108, into two RF nodes, such as RF node 108A and 108B. To split RF node 108 into RF nodes 108A and 1088, reboot and polling tool 110 may first identify client devices that are connected to RF node 108, such as client devices 104A-D. In an embodiment, client devices 104A-D may be client devices of different types. Reboot and polling tool S110 may then poll the status of each client device 104A-D that is connected to RF node

108, RF node 108A, and RF node 108B and display the status of client devices 104A-D alone, or in aggregation, using GUI 202.

In an embodiment, reboot and polling tool 110 may next use a script that generates an SNMP message that changes RF node 108 with which client devices 104A-D are associated. For example, the script may reconnect client devices 104A-D from RF node 108 to RF nodes 108A and 108B. Because client devices 106A-D are of different types, reboot and polling tool 110 may generate a SNMP message for each type of client device.

In an embodiment, after reboot and polling tool 110 executes the script on client devices 104A-D, client devices 104A and 104B should be connected to RF node 108A and client devices 104C and 104D should be connected to RF node 108B. To determine whether the script successfully reconnected client devices 104A-D, reboot and polling tool 110 may execute a post-poll. In the post-poll, reboot and polling tool 110 determines which client devices are connected to RF node 108A and RF node 108B. For example, reboot and polling tool 110 may issue poll messages using SNMP protocol to client devices 104A and 104B using frequency associated with RF node 108A, and to client devices 104C and 104D using frequency associated with RF node 108B. Further, reboot and polling tool 110 may format the SNMP message according to a type of each client device 104A-D. If reboot and polling tool 110 receives a response from client devices 104A and 104B, and 104C and 104D on the frequency associated with respective RF nodes 108A and 108B, the script successfully associated client devices 104A and 104B with RF node 108A, and client devices 104C and 104D with RF node 108B. Alternatively, if client device 104C has not responded to a post-poll message, then an error occurred and reboot and polling tool 110 has not switched client device 104C to RF node 108B or client device 104C has failed. In a further embodiment, tables 300A and 300B may display information that identifies the error, as discussed below.

In another embodiment, reboot and polling tool 110 may execute a script that changes the RF node of client device 104A from RF node 108 to RF node 108A. In this case, reboot and polling tool 110 pre-polls client device 104A-D for status on RF node 108A. Reboot and polling tool 110 then executes a script that changes RF node of client device 104A from RF node 108 to RF node 108A. After executing the script, reboot and polling tool 110 post-polls client devices 104B-D for status on RF node 108 and using frequency associated with poll RF node 108, and post polls client device 104A for status on RF node 108A and using frequency associated with RF node 108A.

As discussed above, FIG. 3A is a table 300A of a list of client devices before reboot and polling tool executes a script, according to an embodiment. In one embodiment, table 300A may be displayed using GUI 202. For example, GUI 202 may display status of client devices 104A and 104B after reboot and polling tool 110 performs a pre-poll of client devices 104A and 104B. In an embodiment, table 300A may include one or more columns. In a further embodiment, additional columns may be added or existing columns may be removed based on the information that may be presented on GUI 202.

In an embodiment, column labeled "ACP" may indicate one or more RF nodes 108 that client devices 104A and 104B may be connected to when client devices 104A and 104B receive a pre-poll message.

In another example, column labeled "Type" may indicate different types of client devices 104A and 104B. In an embodiment, different types of client devices may be aggregated and displayed in a single table or multiple tables. For example, client devices 104A may be displayed in one table and client devices 104B may be displayed in another table that are next to each other.

In another example, columns labeled "Field Name" and "Result" may indicate a name of a parameter or field in the SNMP message (or another message), and information associated with the field, respectively. An example parameter may indicate the boot time of client devices 104A and 104B, registration status of client devices, a number of client devices that have not responded to a pre-poll message, etc. An example "Results" column may indicate whether some, all, or a portion of client devices 104A and 104B have been rebooted today, yesterday, on a particular date, or at some point before a particular date, the frequency that one or more client devices 104A and 104B have been polled at, etc.

In another example, a parameter column may indicate the last time that an upgrade on some, or a portion of client devices 104A and 104B failed, and the "Results" column may indicate the reason for the failure.

In an embodiment, table 300A also includes a "Count" column. The "Count" column indicates aggregate amount of client devices 104A and 104B that are associated with a particular "Field Name" and "Results" columns. For example, count of 1520 in the first row of table 300A indicates that 1520 client devices of type "oms" (Open Media Security) have been rebooted at some point prior to yesterday.

In a further embodiment, table 300A also includes a "Get IPs" column. The "Get IPs" column may include a link to a list of IP addresses associated with client devices 104A and 104B that have been identified for each row in table 300A. In an embodiment, the link may activate when a user clicks on the link, and, once activated, displays another table, listing, etc., in GUI 202 that identifies the IP addresses of client devices 104A and 104B.

As discussed above, FIG. 3B is a table 300B of a list of client devices 104A and 104B after reboot and polling tool 110 executes the script, according to an embodiment. Table 300B may be displayed using GUI 202 on client device 104 and display status of client devices 104A and 104B and/or changes in state of client devices 104A and 104B after reboot and polling tool 110 performs a post-poll of client devices 104A and 104B. As discussed above, reboot and polling tool 110 performs a post-poll after reboot and polling tool 110 sends a script to client devices 104A and 104B at the selected RF node 108 that cause client device 104A and 104B to reboot, perform a software upgrade, change RF nodes, etc.

In an embodiment, table 300B may include the same or different columns as table 300A. Also, table 300B may be split into one or more tables according to client device type, such as an "oms" table and an "sa" table, where "oms" and "sa" (Scientific Atlanta) are each a type of client device, such as a type of a set-top box.

Figure 5:
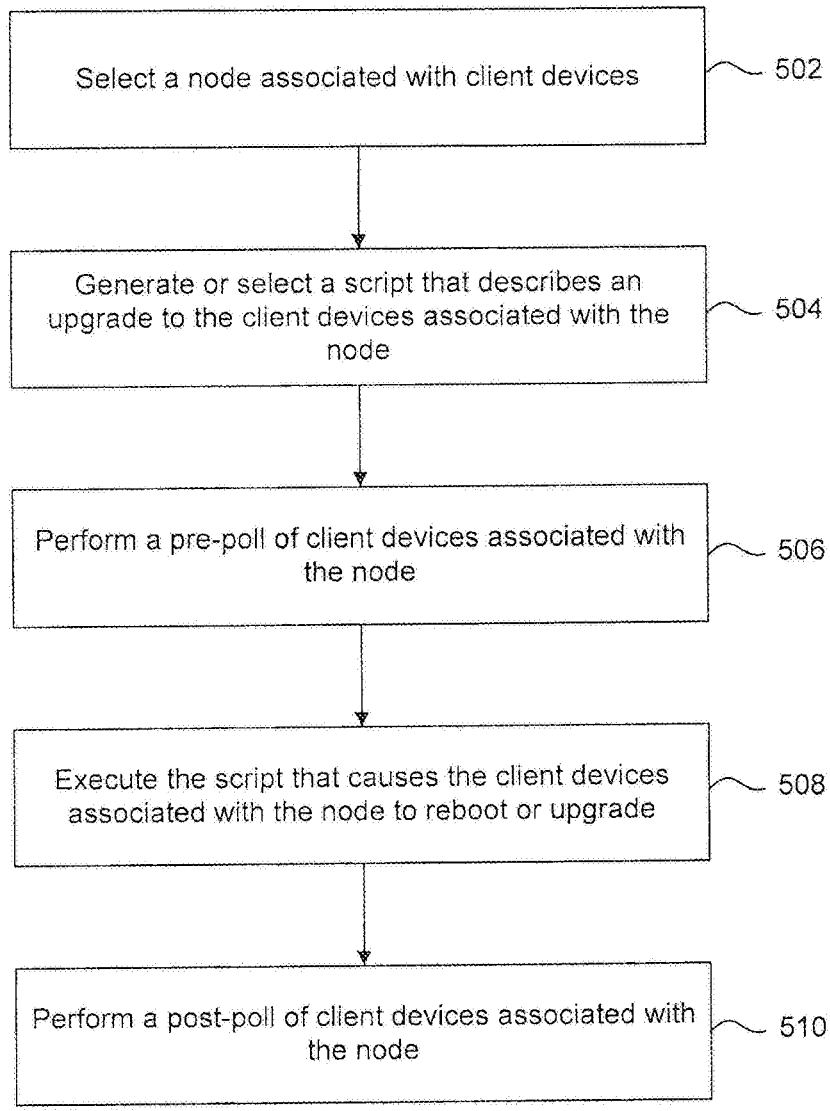
FIG. 5 is a flowchart of a method for performing pre and post-polls of client devices, according to an embodiment.

FIG. 5 is a flowchart of a method 500 for performing pre and post-polls on client devices, according to an embodiment. Method 500 can be performed by processing logic that can comprise hardware (e.g., circuitry, dedicated logic, programmable logic, microcode, etc.), software (e.g., instructions executing on a processing device), or a combination thereof.

At operation 502, an RF node is selected. For example, reboot and polling tool 110 receives a selection of one or more RF nodes 108 that are associated with client devices 104A and 104B. As discussed above, client devices 104A and 104B are of different types and require messages that are specific to a particular type of client device 104A and 104B.

At operation 504, a script is selected or generated. For example, reboot and polling tool 110 receives a selection for a script. Reboot and polling tool 110 may use the script to generate and transmit a particular message to client devices 104A and 104B associated with RF node(s) 108 selected in operation 502. As discussed above, the script may upgrade or reboot client devices 104A and 104B. In an embodiment, the script may be selected using GUI 202 from scripts stored in storage 204, or may also be generated using GUI 202.

At operation 506, a pre-poll of client devices is performed. For example, reboot and polling tool 110 issues one or more messages to client device 104A and 104B that poll information from client devices 104A and 104B. In an embodiment, reboot and polling tool 110 issues one or more SNMP messages that are specific to a particular type of a client device. Reboot and polling tool 110 may also cause the results of the pre-poll to be displayed in GUI 202, as shown in FIG. 3A.

At operation 508, a script is executed. For example, reboot and polling tool 110 uses a script that generates one or more messages. These messages are transmitted to client devices 104A and 104B associated with RF node(s) 108 selected in operation 502. The messages cause client devices 104A and 104B to change RF node(s), perform a software upgrade, reboot, and/or perform another function specified in the script. In an embodiment, the script causes reboot and polling tool 110 to issue a message that is specific to a particular type of a client device.

At operation 510, a post-poll of client devices is performed. For example, reboot and polling tool 110 issues messages to client devices 104A and 104B that poll information from client devices 104A and 104B after a script is executed in operation 508. In an embodiment, reboot and polling tool 110 issues a message that is specific to a particular type of a client device. Reboot and polling tool 110 may also cause the results of the post-poll to be displayed in GUI 202, as shown in FIG. 3B.

Figure 6:
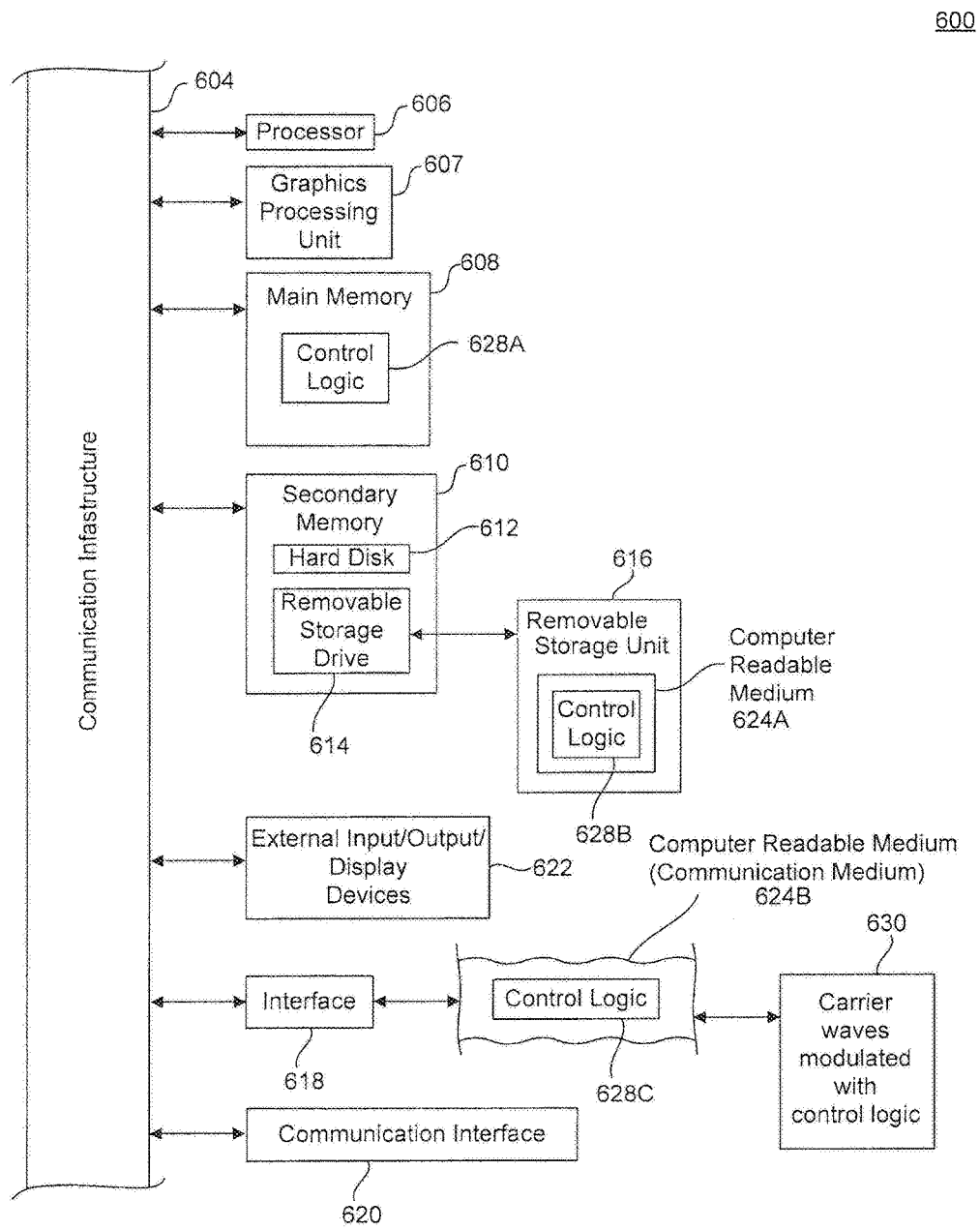
FIG. 6 is a block diagram of a computer system, where the embodiments may be implemented.

Various embodiments of FIGS. 1A-B, and 2-5 may be implemented by software, firmware, hardware, or a combination thereof. FIG. 6 illustrates an example computer system 600 in which the embodiments, or portions thereof, can be implemented as computer-readable code. For example, the methods illustrated by event diagrams described herein can be implemented in system 600. Various embodiments are described in terms of this example computer system 600. After reading this description, it will become apparent to a person skilled in the relevant art how to implement the embodiments using other computer systems and/or computer architectures.

Computer system 600 includes one or more processors, such as processor 606. Processor 606 can be a special purpose or a general purpose processor. Processor 606 is connected to a communication infrastructure 606 (for example, a bus or network).

Computer system 600 also includes one or more graphics processing units, such as graphics processing unit ("GPU") 607. GPU 607 is also connected to a communication infrastructure 604. GPU 607 is a specialized processor that executes instructions and programs, selected for complex graphics and mathematical operations, in parallel. For example, GPU 607 may be adept at displaying and processing streaming media content.

Computer system 600 also includes a main memory 608, such as random access memory (RAM) or another volatile memory that stores data while the computer system is turned on, and may also include a secondary memory 610. Secondary memory 610 may include, for example, a hard disk drive 612 and/or a removable storage drive 614 or another non-volatile storage that maintains data regardless whether computer system 600 is turned on or off. Removable storage drive 614 may comprise a floppy disk drive, a magnetic tape drive, an optical disk drive, a flash memory, or the like. The removable storage drive 614 reads from and/or writes to a removable storage unit 616 in a well-known manner. Removable storage unit 616 may comprise a floppy disk, magnetic tape, optical disk, etc. which is read by and written to by removable storage drive 614. As will be appreciated by persons skilled in the relevant art(s), removable storage unit 616 includes a tangible computer readable storage medium 624A having stored therein control logic 628B such as computer software and/or data.

In alternative implementations, secondary memory 610 may include other similar means for allowing computer programs or other instructions to be loaded into computer system 600. Such means may include, for example, a removable storage unit 616 and an interface 618. Examples of such means may include a program cartridge and cartridge interface (such as that found in video game devices), a removable memory chip (such as an EPROM, or PROM) and associated socket, and other removable storage units 616 and interfaces 618 which allow software and data to be transferred from the removable storage unit 616 to computer system 600. As will be appreciated by persons skilled in the relevant art(s), interface 618 also includes a tangible computer readable storage medium 624B having stored therein control logic 628C such as computer software and/or data.

Computer system 600 may also include a communications interface 620. Communications interface 620 allows software and data to be transferred between computer system 600 and external devices 622. Communications interface 620 may include a modem, a network interface (e.g., an Ethernet card), a communications port, a PCMCIA slot and card, or the like. Software and data transferred via communications interface 620 are in the form of signals which may be electronic, electromagnetic, optical, or other signals capable of being received by communication interface 620. Software and data transferred via communications interface 620 are provided to communications interface 620 via a communications path. Communications path may be implemented using wire or cable, fiber optics, a phone line, a cellular phone link, a radio frequency (RF) link or other communications channels.

The communication and network interface 620 allows the computer system 600 to communicate over communication networks or mediums such as LANs, WANs the Internet, etc. The communication and network interface 620 may interface with remote sites or networks via wired or wireless connections.

In this document, the terms "computer program medium" and "computer usable medium" and "computer readable medium" are used to generally refer to media such as removable storage unit 616 and a hard disk 612 installed in hard disk drive 612. Computer program medium, computer usable medium, or computer readable medium can also refer to memories, such as main memory 608 and secondary memory 610, which can be memory semiconductors (e.g. DRAMs, etc.). These computer program products are means for providing software to computer system 600.

Computer programs (also called computer control logic 628) are stored in main memory 608, such as control logic 628A and/or secondary memory 610, such as control logic 628B. Computer programs may also be received via interface 618, such as control logic 628C. Such computer programs, when executed, enable computer system 600 to implement embodiments as discussed herein, such as the system described above. In particular, the computer programs, when executed, enable processor 606 to implement the processes of embodiments. Accordingly, such computer programs represent controllers of the computer system 600. Where embodiments are implemented using software, the software may be stored in a computer program product and loaded into computer system 600 using removable storage drive 614, interface 618, hard drive 612 or communications interface 622.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

In the detailed description above, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system for performing an action on a plurality of client devices, comprising:
    a memory that stores a reboot and polling tool;
    a processor configured to execute the reboot and polling tool, the reboot and polling tool, when executed by the processor, configuring the processor to:
        issue a first message to a first client device from among the plurality of client devices and a second message to a second client device from among the plurality of client devices to poll information identifying a state of the first client device and a state of the second client device, respectively, wherein the first message is specific to a type of the first client device, and wherein the second message is specific to a type of the second client device, the type of the first client device being different from the type of the second client device,
        execute a script to cause the first client device and the second client device to perform the action, and
        issue a third message to the first client device and a fourth message to the second client device to poll information identifying changes in the state of the first client device and in the state of the second client device, respectively, caused by executing the script, wherein the third message is specific to the type of the first client device, and wherein the fourth message is specific to the type of the second client device.

2. The system of claim 1, wherein the action comprises:
    perform a software upgrade;
    perform a reboot; or
    perform a function specified in the script.

3. The system of claim 1, wherein the reboot and polling tool, when executed by the processor, further configures the processor to issue the third message and the fourth message after executing the script.

4. The system of claim 1, wherein the first message, in relation to the second message, comprises a different field or different information within a field that is particular to the type of the first client device.

5. The system of claim 1, wherein the third message, in relation to the fourth message, comprises a different field or different information within a field that is particular to the type of the first client device.

6. The system of claim 1, wherein the script, when executed by the processor, further configures the processor to:
identify the type of the first client device and the type of the second client device,
generate a fifth message and a sixth message that is particular to the type of the first client device and the type of the second client device, respectively, and
transmit the fifth message and the sixth message to the first client device and the second client device, respectively, to cause the first client device and the second client device to perform the action.

7. The system of claim 1, wherein the fifth message and the sixth message comprise different Simple Network Management Protocol (SNMP) messages.

8. The system of claim 1, wherein the reboot and polling tool, when executed by the processor, further configures the processor to selectively choose the script from among a plurality of scripts.

9. A method for performing an action on a plurality of client devices, comprising:
issuing, by a reboot and polling tool executing on a processor, a first message to a first client device from among the plurality of client devices and a second message to a second client device from among the plurality of client devices to poll information identifying a state of the first client device and a state of the second client device, respectively, wherein the first message is specific to a type of the first client device, and wherein the second message is specific to a type of the second client device, the type of the first client device being different from the type of the second client device,
executing, by the reboot and polling tool executing on the processor, a script to cause the first client device and the second client device to perform the action, and
issuing, by the reboot and polling tool executing on the processor, a third message to the first client device and a fourth message to the second client device to poll information identifying changes in the state of the first client device and in the state of the second client device, respectively, caused by executing the script, wherein the third message is specific to the type of the first client device, and wherein the fourth message is specific to the type of the second client device.

10. The method of claim 9, wherein the action comprises:
performing a software upgrade;
performing a reboot; or
performing a function specified in the script.

11. The method of claim 9, further comprising:
issuing the third message and the fourth message after executing the script.

12. The method of claim 9, wherein the first message, in relation to the second message, comprises a different field or different information within a field that is particular to the type of the first client device.

13. The method of claim 9, wherein the third message, in relation to the fourth message, comprises a different field or different information within a field that is particular to the type of the first client device.

14. The method of claim 9, wherein the executing comprises:
identifying the type of the first client device and the type of the second client device,
generating a fifth message and a sixth message that is particular to the type of the first client device and the type of the second client device, respectively, and
transmitting the fifth message and the sixth message to the first client device and the second client device to cause the first client device and the second client device to perform the action.

15. The method of claim 9, wherein the fifth message and the sixth message comprise different Simple Network Management Protocol (SNMP) messages.

16. The method of claim 9, further comprising:
selectively choosing the script from among a plurality of scripts.

17. A system for performing an action on a client device from among a plurality of client devices, comprising:
a memory that stores a reboot and polling tool;
a processor configured to execute the reboot and polling tool, the reboot and polling tool, when executed by the processor, configuring the processor to:
issue a first message to the client device to poll information identifying a state of the client device, the first message being specific to a type of the client device,
execute a script to cause the client device to perform the action, and
issue a second message to the client device to poll information identifying changes in the state of the client device caused by executing the script, the second message being specific to the type of the client device.

18. The system of claim 17, wherein the action comprises:
perform a software upgrade;
perform a reboot; or
perform a function specified in the script.

19. The system of claim 17, wherein the reboot and polling tool, when executed by the processor, further configures the processor to:
issue a third message to a second client device from among the plurality of client devices to poll information identifying a state of the second client device, the second client device being a different type than the client device, wherein the third message is specific to a type of the second client device and differs from the first message,
execute the script to cause the second client device to perform the action, and
issue a fourth message to the second client device to poll information identifying changes in the state of the second client device caused by executing the script, the fourth message being specific to the type of the client device and differing from the second message.

20. The system of claim 19, wherein the third message, in relation to the first message, comprises a different field or different information within a field that is particular to a type of the second client device, and
wherein the fourth message, in relation to the second message, comprises a different field or different information within a field that is particular to a type of the second client device.

* * * * *